United States Patent
Hamada et al.

(10) Patent No.: US 6,728,635 B2
(45) Date of Patent: Apr. 27, 2004

(54) LANDMARK UPDATE SYSTEM AND NAVIGATION DEVICE

(75) Inventors: Hiroyuki Hamada, Yawata (JP); Kiyomi Sakamoto, Ikoma (JP); Teruaki Ata, Osaka (JP); Atsushi Yamashita, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 187 days.

(21) Appl. No.: 09/974,897

(22) Filed: Oct. 12, 2001

(65) Prior Publication Data

US 2002/0072848 A1 Jun. 13, 2002

(30) Foreign Application Priority Data

Dec. 12, 2000 (JP) ........................ 2000-377124

(51) Int. Cl.⁷ .............................................. G01C 21/30
(52) U.S. Cl. ..................................................... 701/211
(58) Field of Search ................................. 701/200–202, 701/206–209, 211–214; 340/988, 990, 995; 709/203, 213, 217; 705/10

(56) References Cited

U.S. PATENT DOCUMENTS

| | | | |
|---|---|---|---|
| 6,510,379 B1 * | 1/2003 | Hasegawa et al. | 701/202 |
| 6,553,310 B1 * | 4/2003 | Lopke | 701/213 |
| 6,571,279 B1 * | 5/2003 | Herz et al. | 709/217 |

FOREIGN PATENT DOCUMENTS

| | | | | |
|---|---|---|---|---|
| JP | 07-261661 | | 10/1995 | |
| JP | 09-243380 | | 9/1997 | |
| JP | 09-288684 | | 11/1997 | |
| JP | 11-095657 | | 4/1999 | |
| JP | 11-095657 | * | 9/1999 | ........... G09B/29/00 |

OTHER PUBLICATIONS

Mikkola et al (US 2002/0047787).*

* cited by examiner

Primary Examiner—Thu V. Nguyen
(74) Attorney, Agent, or Firm—Wenderoth, Lind & Ponack, L.L.P.

(57) ABSTRACT

The present landmark update system enables route guidance through the use of landmark information which remains always the latest for route guidance, and operates as follows: a navigation device 1 communicates with a landmark server 30 so as to receive to-be-updated landmark information 1001 for guiding the user by utilizing landmarks. Information about any landmark displayed is transferred to the landmark server 30 as cumulative information 1002. The landmark server 30 manages the cumulative information 1002 so that compilation data 1003 is generated for transfer to a retailer terminal 40 corresponding to the displayed landmark(s). The retailer terminal 40 refers to the compilation data 1003 so as to generate landmark information which is considered optimum, and transfers it to the landmark server 30 as registering landmark information 1004.

12 Claims, 10 Drawing Sheets

LANDMARK UPDATE SYSTEM AND NAVIGATION DEVICE

BACKGROUND OF THE INVENTION

1. Field of the Invention

The present invention relates to systems for updating landmarks to be used for navigation, and navigation devices equipped in the systems. More specifically, the present invention relates to landmark update systems and navigation devices capable of keeping the most current landmark information for route guidance performed through the use thereof.

2. Description of the Background Art

A conventional type of navigation device typically equipped in a vehicle generally guides a driver by indicating, by name, at which intersection he/she is supposed to make a turn, or how far the intersection is from the vehicle. The issue here is, the driver may not easily find the indicated intersection on a display when his/her vehicle is far therefrom. Also, if guided as "XX meters left to the intersection", the driver may not intuitively grasp the actual distance to the intersection. Therefore, the driver may find it difficult to estimate in advance the rough location of the intersection. As such, guidance by the conventional navigation device is often found difficult to follow.

To get around such a problem, the recent type of navigation device displays various facilities located around the intersection, and makes use of those as landmarks when guiding vehicles. For example, guidance is made as "take a right turn at the post office, go straight till the gas station reached, and then take a left turn there".

As to those landmarks, information thereabout is required to be always accurate in route guidance, and is usually stored in media such as CDs and DVDs.

The issue here is, those landmarks do not remain the same, and for example, a gas station may move, be closed, or any other new gas station may be opened. In order to catch up with such changes, the medium having landmark information stored therein needs to be frequently replaced with another. However, such frequent replacement is practically difficult in terms of cost and time for manufacturers who have been so far doing the replacement, and consequently the reliability of the landmark information in the conventional navigation device becomes low.

SUMMARY OF THE INVENTION

Therefore, in order to easily keep landmark information always accurate for route guidance by navigation devices, an object of the present invention is to provide landmark update systems and navigation devices capable of easily deriving, at the time of route guidance, landmark information which is appropriately maintained by companies and retail shops who are to be displayed as landmarks.

The present invention has the following features to attain the object above.

A first aspect of the present invention is directed to a landmark update system for updating, to be the latest, landmark information which is displayed together with a route for route guidance. The landmark update system comprises a navigation device, a landmark server, and a retailer terminal. The navigation device performs route guidance through the use of landmark information which is determined as the latest based on incoming landmark information over a first communications line. The retailer terminal registers the latest landmark information to a landmark server by communicating with the landmark server over a second communications line. The landmark server communicates with the navigation device over the first communications line, and offers the latest landmark information which is registered. Further, to the landmark server over the first communications line, the navigation device transfers cumulative information which includes information about a landmark used during the route guidance. Based on the cumulative information transferred over the first communications line and information about the navigation device from which the cumulative information is transferred, the landmark server generates compilation data obtained by subjecting the cumulative information to a compilation process, and transfers the compilation data to the corresponding retailer terminal over the second communications line.

As described above, in the first aspect, in order to easily keep landmark information always accurate for route guidance by navigation devices, provided are landmark update systems and navigation devices capable of easily deriving, at the time of route guidance, landmark information which is appropriately maintained by companies and retail shops who are to be displayed as landmarks.

According to a second aspect, further to the first aspect, the retailer terminal refers to the compilation data transferred over the second communications line, and generates and registers new landmark information in a predetermined case.

As described above, in the second aspect, the retailer terminal determines the advertising effect by referring to the compilation data, and in a predetermined case, automatically generates and registers any new landmark information.

According to a third aspect, in further to the first aspect, the cumulative information includes the number of times a specific landmark is displayed to a user on the navigation device, and point information in which the user's visit to the displayed landmark is scored.

As described above, in the third aspect, the cumulative information includes the number of times a specific landmark is displayed and its point. Therefore, by utilizing such information, the retailer terminal can know the advertising effect of the landmark.

According to a fourth aspect, further to the first aspect, the landmark information includes location information which indicates the location of a landmark, shape information which specifies the landmark by shape for display, and additional information which is displayed to the user together with the landmark.

As described above, in the fourth aspect, the landmark information includes additional information together with any other essential information for landmark display. Therefore, by using the additional information as companies' advertisements, for example, the companies can have the merit of maintaining the landmark information, and the cost taken therefor can be reduced, whereby the frequency of updating the landmark information can be also reduced.

According to a fifth aspect, further to the fourth aspect, the landmark information further includes a display condition which indicates a predetermined condition for displaying the additional information.

As described above, in the fifth aspect, by changing conditions for displaying the additional information, any commercial information which is currently considered optimum is selected, for display, from those others covering various needs of the retail shops and companies represented as the landmarks.

According to a sixth aspect, further to the first aspect, the navigation device comprises: a cartographic data storage section for storing cartographic data; a landmark information storage section for storing the landmark information; a location detection section for detecting the user's current location; a communications section for communicating with the landmark server over the first communications line; an output section for outputting the route guidance for display; an input section for inputting information needed at least for route search; a route selection section for selecting, responding to the information provided by the input section, a route from the user's current location detected by the location detection section on the cartographic data; a landmark information management section for managing the landmark information stored in the landmark information storage section based on the latest landmark information received from the landmark server via the communications section if there needs to update landmark information corresponding to any landmark located on the route selected by the route selection section; and a guidance section for instructing the output section to display a map based on the cartographic data read from the cartographic data storage section, to display the route on the map displayed on the output section based on the route selected by the route selection section, and to perform landmark display on each appropriate location on the map displayed on the output section based on the landmark information read from the landmark information storage section. The landmark information management section generates the cumulative information based on information about what landmark is instructed by the guidance section to display and what landmark is used, and instructs the communications section to transfer the cumulative information.

As described above, in the sixth aspect, provided are landmark update systems enabling route guidance through the use of landmark information which is always accurate in navigation devices.

According to a seventh aspect, further to the sixth aspect, the guidance section refers to the user's current location detected by the location section, and when it is determined that the user actually reaches a specific displayed landmark by utilizing the same, generates the cumulative information based on information about the utilized landmark.

As described above, in the seventh aspect, the cumulative information includes information about the point of a specific landmark, for example. Therefore, by utilizing such information, the retailer terminal can know the advertising effect of the landmark.

According to an eighth aspect, further to the sixth aspect, the navigation device further includes a real-time information acquisition section for acquiring real-time information which is a parameter indicating in what states various matters are. Based on the real-time information acquired by the real-time information acquisition section, the guidance section specifically determines landmark display.

As described above, in the eighth aspect, based on the change of the real-time information, any commercial information which is currently considered optimum is selected, for display, from those others covering various needs of the retail shops and companies represented as the landmarks.

According to a ninth aspect, further to the first aspect, the landmark server comprises: a cumulative information storage section for storing the cumulative information transferred from the navigation device over the first communications line together with the information about the navigation device from which the cumulative information is transferred; a cumulative information management section for generating the compilation data obtained by subjecting the cumulative information to the compilation process based on the cumulative information stored in the cumulative information storage section and the information about the navigation device, and transferring the compilation data to the corresponding retailer terminal over the second communications line; a registering landmark information storage section for storing the landmark information transferred from the retailer terminal over the second communications line; and a registering landmark information management section for transferring the landmark information stored in the registering landmark information storage section to the navigation section over the first communications line, if necessary, so that the landmark information is updated to be the latest for display to the user on the navigation device.

As described above, in the ninth aspect, provided are landmark update systems enabling route guidance through the use of landmark information which is always accurate in navigation devices, and feeding back information about whatever landmark used by the user to the retailer terminal.

According to a tenth aspect, further to the ninth aspect, the landmark server further comprises an advertising fee calculation section for calculating a fee corresponding to whatever landmark registered by the retailer terminal based on the number of landmark display times at least included in the compilation data.

As described above, in the tenth aspect, the advertising fee is determined based on the exposure of the landmark. Therefore, the price charged against the retail shops and companies can be fair and substantial.

According to an eleventh aspect, further to the first aspect, the retailer terminal comprises: a compilation information acquisition section for acquiring the compilation data transferred from the landmark server over the second communications line; a landmark information effect determination section for determining whether the registered landmark information is used with a predetermined frequency by referring to the compilation data acquired by the compilation information acquisition section; a landmark information change section for chancing the registered landmark information partially or entirely when the landmark information effect determination section determines that the registered landmark information is not used with the predetermined frequency; and a landmark information transfer section for transferring, when the landmark information is changed in the landmark information change section, the changed landmark information to the landmark server over the second communications line for newly registering the changed landmark information.

As described above, in the eleventh aspect, provided are landmark update systems enabling route guidance through the use of landmark information which is always accurate in navigation devices.

A twelfth aspect of the present invention is directed to a navigation device for updating landmark information, to be the latest, which is displayed together with a route for route guidance by communicating with a landmark server which offers the latest landmark information, and offering information about what landmark is displayed and what landmark is used to the landmark server. The navigation device of the twelfth aspect comprises: a cartographic data storage section for storing cartographic data; a landmark information storage section for storing the landmark information; a location detection section for detecting the user's current location; a communications section for communicating with the landmark server; an output section for outputting the route guidance for display; an input section for inputting information needed at least for route search; a route selection section for selecting, responding to the information provided by the input section, a route from the user's current location detected by the location detection section on the cartographic data; a landmark information management section for managing the landmark information stored in the landmark information storage section based on the latest landmark information received from the landmark server via the communications section if there needs to update landmark information corresponding to any landmark located on the route selected by the route selection section; and a guidance section for instructing the output section to display a map based on the cartographic data read from the cartographic data storage section, to display the route on the map displayed on the output section based on the route selected by the route selection section, and to perform landmark display on each appropriate location on the map displayed on the output section based on the landmark information read from the landmark information storage section. The landmark information management section generates the cumulative information based on information about what landmark is instructed by the guidance section to display and what landmark is used, and instructs the communications section to transfer the cumulative information.

As described above, in the twelfth aspect, in order to easily keep landmark information always accurate for route guidance by navigation devices, provided are landmark update systems and navigation devices capable of easily deriving, at the time of route guidance by feeding back to the server side what landmark information has been used, for example, landmark information which is appropriately maintained by companies and retail shops who are to be displayed as landmarks.

According to a thirteenth aspect, further to the twelfth aspect, the guidance section refers to the user's current location detected by the location section, and when it is determined that the user actually reaches a specific displayed landmark by utilizing the same, generates the cumulative information based on information about the utilized landmark.

As described above, in the thirteenth aspect, the cumulative information includes information about points of the landmarks, for example. Therefore, by utilizing such information, the server side can know the advertising effect of the landmark.

According to a fourteenth aspect, further to the twelfth aspect, the navigation device further includes a real-time information acquisition section for acquiring real-time information which is a parameter indicating in what states various matters are, and based on the real-time information acquired by the real-time information acquisition section, the guidance section specifically determines landmark display.

As described above, in the fourteenth aspect, based on the change of the real-time information, any commercial information which is currently considered optimum is selected, for display, from those others covering various needs of the retail shops and companies represented as the landmarks.

According to a fifteenth aspect, further to the twelfth aspect, the cumulative information includes the number of times the landmark is displayed to a user on the navigation device, and point information in which the user's visit to the displayed landmark is scored.

As described above, in the fifteenth aspect, the cumulative information includes the number of times a specific landmark is displayed and its point. Therefore, by utilizing such information, the server side can know the advertising effect of the landmark.

According to a sixteenth aspect, further to the twelfth aspect, the landmark information includes location information which indicates the location of a landmark, shape information which specifies the landmark by shape for display, and additional information which is displayed to the user together with the landmark.

As described above, in the sixteenth aspect, the landmark information includes additional information together with any other essential information for landmark display. Therefore, by using the additional information as companies' advertisements, for example, the companies can have the merit of maintaining the landmark information, and the cost taken therefor can be reduced, whereby the frequency of updating the landmark information can be also reduced.

According to a seventeenth aspect, in further to the sixteenth aspect, the landmark information further includes a display condition which indicates a predetermined condition for displaying the additional information.

As described above, in the seventeenth aspect, by changing conditions for displaying the additional information, any commercial information which is currently considered optimum is selected, for display, from those others covering various needs of the retail shops and companies represented as the landmarks.

These and other objects, features, aspects and advantages of the present invention will become more apparent from the following detailed description of the present invention when taken in conjunction with the accompanying drawings.

DESCRIPTION OF THE PREFERRED EMBODIMENT

Figure 1:
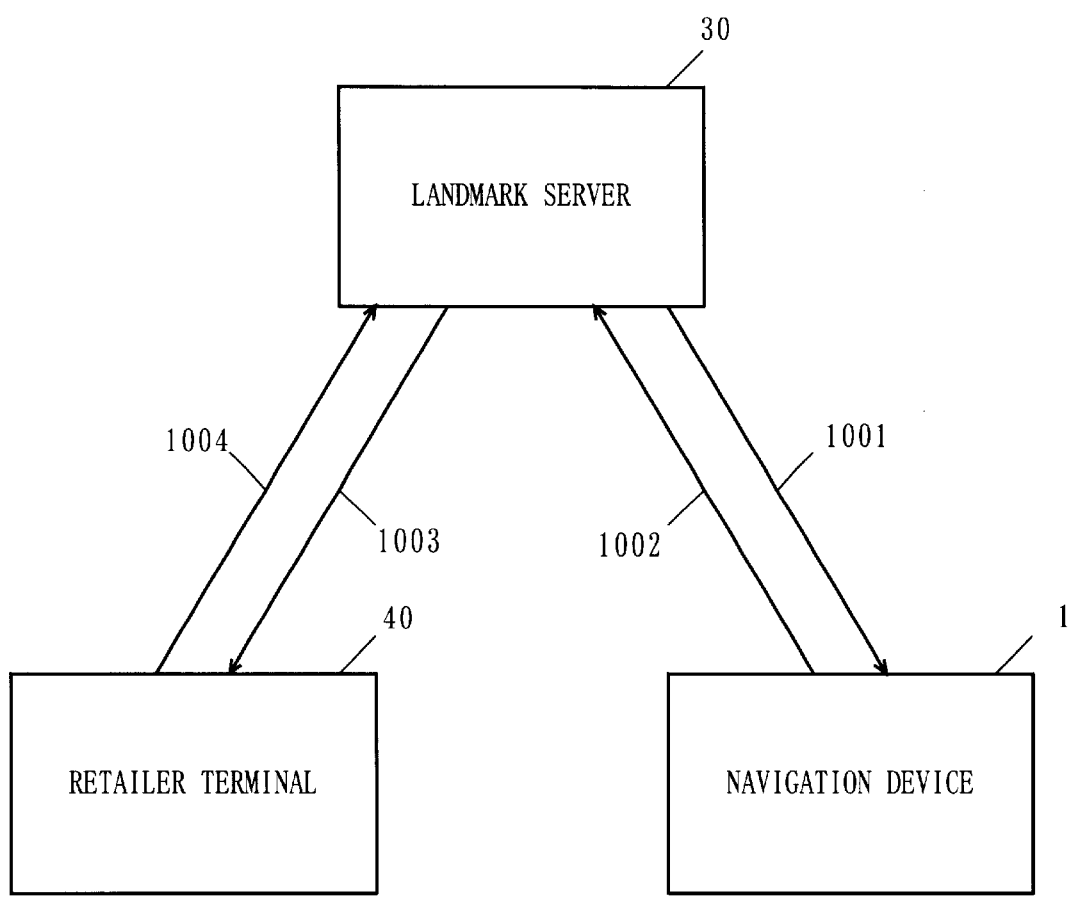
FIG. 1 is a block diagram showing the structure of a landmark update system according to one embodiment of the present invention.

FIG. 1 is a block diagram showing the structure of a landmark update system according to one embodiment of the present invention. In FIG. 1, the present landmark update system includes a navigation device 1, a landmark server 30, and a terminal on the retail shop or company side (hereinafter, "retailer terminal") 40. The navigation device 1 and the landmark server 30 are connected through a communications line for communications therebetween. Similarly, the retailer terminal 40 and the landmark server 30 are connected through another communications line. Here, these communications lines are exemplary of communications media including telephone lines, leased lines, mobile telephony service, and the like. The Internet is typically used for such communications.

In this landmark update system, the navigation device 1 communicates with the landmark server 30 so as to receive to-be-updated landmark information 1001 therefrom. The navigation device 1 guides the user through the use of landmarks included in the to-be-updated landmark information 1001. About each of the landmarks displayed for route guidance this time, the landmark server 30 receives cumulative information 1002 from the navigation device 1 indicating how many times the landmark has been displayed or used, for example. Under the management of the landmark server 30, the received cumulative information 1002 is used as the basis of compilation data 1003. Thus generated compilation information 1003 is forwarded to the retailer terminal 40, which corresponds to the landmark. With reference to the compilation data 1003, the retailer terminal 40 generates registering landmark information 1004 as landmark information which is currently considered optimum, and forwards it to the landmark server 30.

As such, with the present landmark update system in such a structure, the retailer terminal 40 enables its owner, i.e., retail shops and companies, to make the registering landmark information 1004 user-preferred with the help of the incoming compilation data 1003. On the navigation device 1 side, the to-be-updated landmark information 1001 provided to its user can always be the latest most current thanks to the cumulative information 1002.

Figure 2:
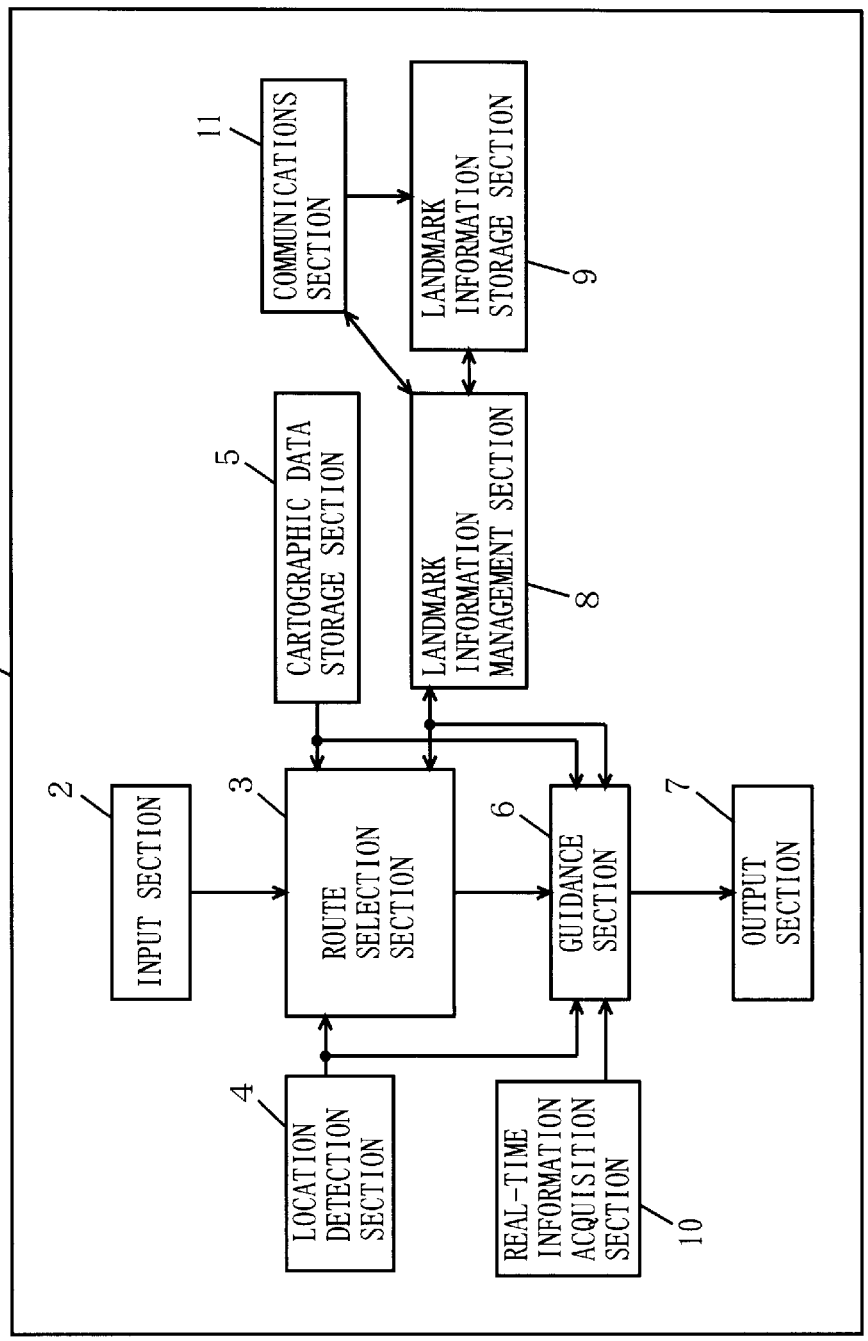
FIG. 2 is a block diagram showing the detailed structure of a navigation device 1 of FIG. 1.

Described next is the structure and operation of the navigation device 1 of FIG. 1, realizing such a landmark update system. FIG. 2 is a block diagram showing the detailed structure of the navigation device 1. In FIG. 2, the present navigation device 1 includes an input section 2, a route selection section 3, a location detection section 4, a cartographic data storage section 5, a guidance section 6, an output section 7, a landmark information management section 8, a landmark information storage section 9, a real-time information acquisition section 10, and a communications section 11.

The input section 2 is composed of, for example, a cross pad, a mouse, and/or a keyboard, all of which are user-operable. Through the input section 2, the user inputs information about a map number, a starting point, a stopover (s), and a destination for route guidance.

The output section 7 is composed of, for example, a display, and/or a speaker, and displays various types of information needed for guidance, e.g., map, vehicle's current location, found guidance route, landmarks, and guides the vehicle by voice whenever required.

The communications section 11 has the function of communicating with a management server, which will be described later, or with an information terminal connected to the management server. The main operation of the communications section 11 is to acquire landmark information, or send out cumulative information stored in the device.

The real-time information acquisition section 10 is composed of various types of sensors, and acquires various real-time information therethrough. Here, the real-time information is a variable parameter including the vehicle's current location, vehicle speed, date, day of the week, time, gas level, weather, temperature, information about traffic jams and constructions provided by the VICS, and the like. The received real-time information is passed to the guidance section 6.

The location detection section 4 is composed of a GPS, a radio beacon receiver, a vehicle speed sensor, an angular speed sensor, an absolute azimuth sensor, and the like, and detects where the navigation device 1 is currently located. When the location detection section 4 is composed of a radio or optical beacon receiver, and when radio or optical beacon signals include the real-time information, e.g., information about traffic jams, the location detection section 4 will function as a part of the real-time information acquisition section 10.

The cartographic data storage section 5 is composed of a large-capacity storage device, and includes a recording medium such as CD-ROMs or DVDs, for example. Stored in the cartographic data storage section 5 is two-dimensional and/or three-dimensional data used for drawing a map, which is herein called cartographic data.

The landmark information storage section 9 is a combination of a read-only storage device (e.g., storage device including recording media such as CD-ROMs or DVDs) and a readable/writable storage device (e.g., CD R/W, DVD, RAM, compact flash memory, smart media, semiconductor memory, hard disk drive). The landmark information stored in the read-only storage device is the one initially provided, while the one in the readable/writable storage device is the latest landmark information coming from the communications section 11. Additionally stored in the read-only storage device are a plurality of image elements (e.g., two-dimensional image information, polygon data, vector data) for each landmark type. Each image element is under the file name for easy search.

The landmark information management section 8 extracts the latest landmark information from the landmark information storage section 9, and passes it to the route selection section 3 or the guidance section 6. The operation of the landmark information management section 8 at this time will be described later in detail.

In response to the input provided by the input section 2, the route selection section 3 refers to the current location detected by the location detection section 4, the cartographic data stored in the cartographic data storage section 5, and the latest landmark information read from the landmark information management section 8 so as to perform route selection.

Upon receipt of information about the result of route selection (hereinafter, route information) from the route selection section 3, the guidance section 6 determines what information is to be added to the received latest landmark information for display at which timing. The guidance section 6 then executes commands required to display the cartographic data and information about landmarks for output to the output section 7.

The structure of such a navigation device 1 of FIG. 2 can be realized in general computer systems. As an example, the CPU of the present navigation device operates in accordance with programs recorded on ROMs, RAMs, hard disks, and the like. Thus, the route selection section 3, the guidance section 6, and the landmark information management section 8 are functionally realized by their corresponding programs. In such cases, the present navigation device may implement a recording medium having such programs recorded thereon.

Figure 3:
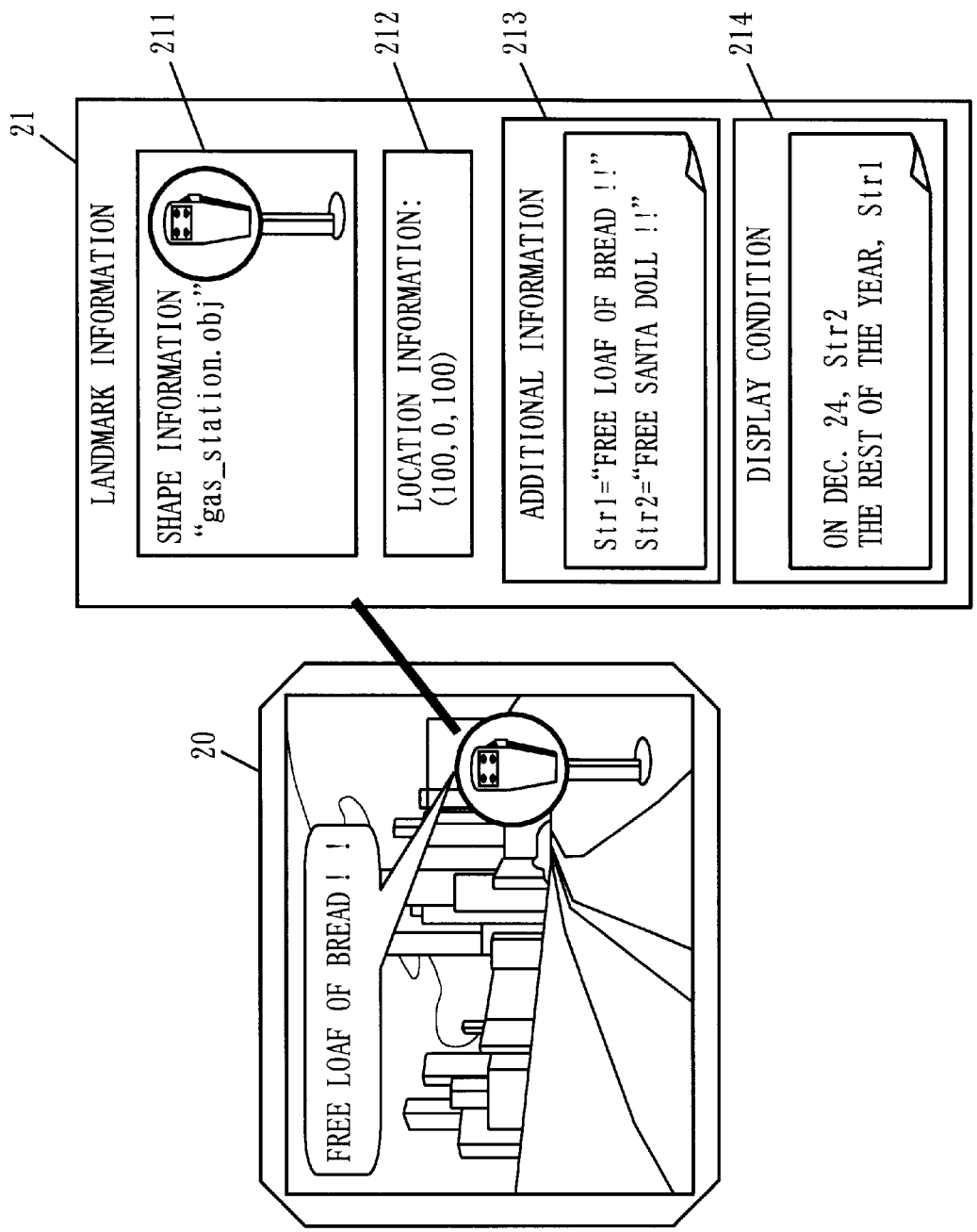
FIG. 3 is a schematic diagram showing an example of landmark information 21, and an example of a display screen 20 with the landmark information 21 displayed thereon.

FIG. 3 is a schematic diagram showing an example of landmark information 21, and an example of a display screen 20 with the landmark information 21 displayed thereon. In FIG. 3, the landmark information 21 includes shape information 211, location information 212, additional information 213, and a display condition 214. In detail, the shape information 211 is used to specify landmarks by shape which are to be displayed on the output section 7. The location information 212 specifies the landmarks by location on the map. The additional information 213 is used for commercial advertising, for example, and the display condition 214 is a condition for displaying the additional information 213. In this example, the additional information 213 is composed of two character string data representing "Free loaf of bread!!" and "Free Santa doll!!", respectively.

In accordance with the shape information 211 and the additional information 213, any appropriate landmark is displayed, on the cartographic data, at the location specified by the location information 212. The resultant screen looks like the display screen 20. Here, the deciding factor for which of those two character string data is to be displayed together with the shape information is the display condition 214. In the example of FIG. 3, displayed on Christmas Eve, i.e., December 24, is the character string "Free Santa doll!!", and the character string "Free loaf of bread!!" is displayed for the rest of the year.

The additional information 213 may be displayed in various manners, for example, overlaid on the cartographic data and the shape information, arranged in a speech bubble as shown in FIG. 3, or set to run across the screen. Moreover, the characters may be flashed on and off, or changed in color, size, or font, for example. As such, by interrelating the contents of the additional information 213 to the display condition 214, the navigation device 1 can select and display whatever appropriate commercial information as circumstances demand. The commercial information covers various needs of the retail shops and companies represented as the landmarks, and advertises what service is available under what condition, for example, special sale in a specific time range, lady's day for a specific day of the week, half-price sale when it rains, or free gift with refueling 20 liters or more.

Further, during when the user's vehicle is running faster than a predetermined speed, the text appearing on the screen may be brief like "Free loaf of bread", and if at the predetermined speed or slower, the text becomes longer to appeal strongly the user like "Free loaf of bread. Yummy bread from XX hotel". As such, effects to be imposed by the advertisement can be maximized as circumstances allow.

In the present landmark update system, the additional information 213 and the display condition 214 are updated as appropriate through communications with the landmark server 30. As a result, commercial information displayed to the user can always sufficiently meet his/her needs.

Figure 4:
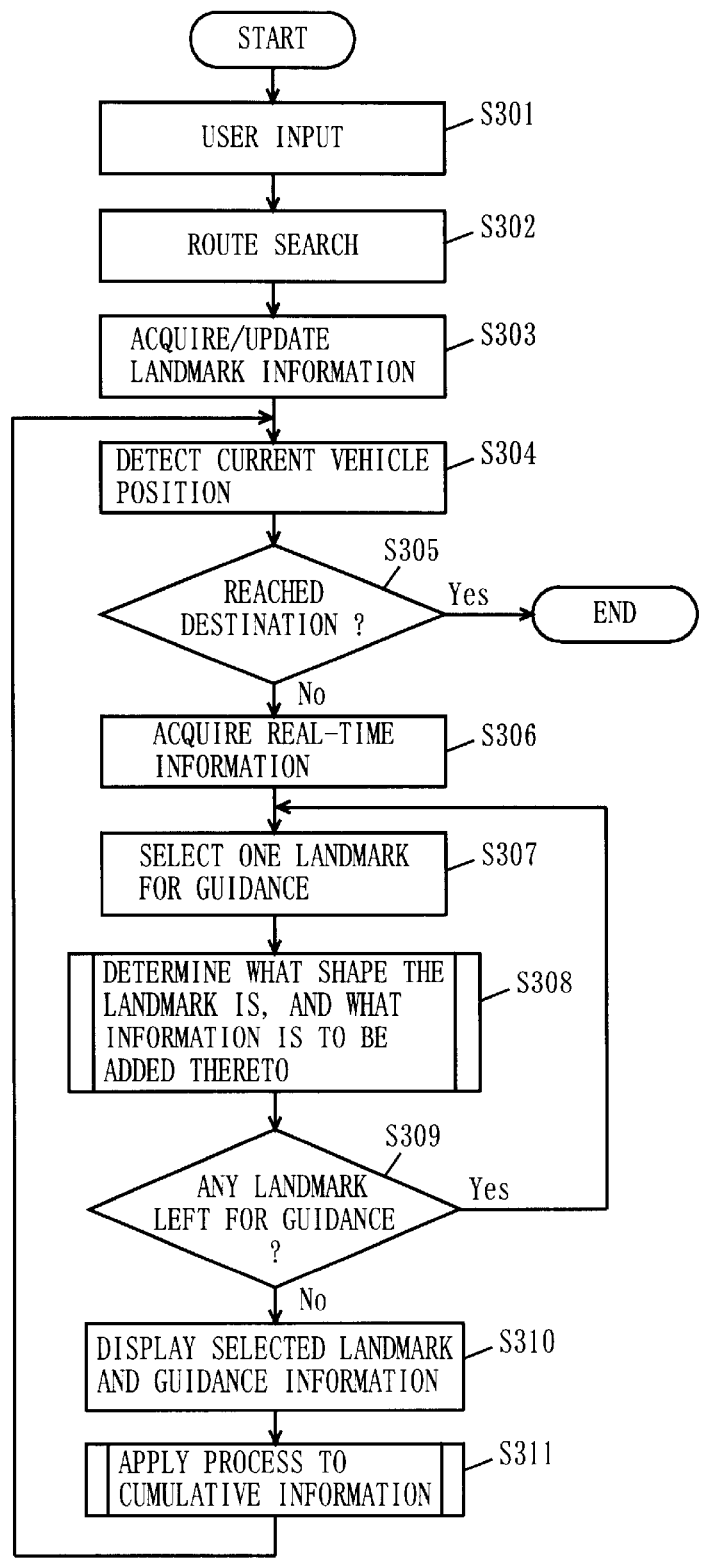
FIG. 4 is a flowchart showing a sequence of processes applied in the navigation device 1.

Described next is the procedure of the navigation device 1 for displaying such landmarks. FIG. 4 is a flowchart showing a sequence of processes applied in the navigation device 1. In step S301 of FIG. 4, the user operates the input section 2 so as to input any information needed for route guidance, e.g., starting point, stopover(s), destination. Here, the user may select commercial information by category depending on what advertisement he/she wants to see on the way to the destination. The contents of thus selected category(ies) are stored as cumulative information.

In step S302, the route selection section 3 refers to the current location detected by the location detection section 4, the cartographic data stored in the cartographic data storage section 5, and the landmark information read from the landmark information management section 8, the route selection section 3 performs route selection.

In step S303, the landmark information management section 8 requests the communications section 11 to acquire landmark information corresponding to the landmark(s) selected by the route selection section 3. In response, the communications section 11 acquires, from the landmark server 30, information about the date and time when the landmark information was generated. Thus acquired date and time information is passed to the landmark information management section 8. The landmark information management section 8 then refers to the landmark information storage section 9 to see when the landmark information currently stored therein was generated for comparison with the date and time information provided by the communications section 11. If the date and time information provided by the communications section 11 is more recent, the landmark information management section 8 requests the communications section 11 to acquire the landmark information in its entirety. In response, the communications section 11 communicates with the landmark server 30 so as to acquire the to-be-updated landmark information 1001, and passes it to the landmark information management section 8. Upon receipt of the landmark information, the landmark information management section 8 replaces it with the stale landmark information in the landmark information storage section 9, i.e., update.

In step S303, the landmark information management section 8 may not always respond to every selected landmark to determine whether or not to update its corresponding landmark information. Alternatively, the timing may be predetermined for the purpose, or whatever landmark determined as needing updating may be collectively updated later.

In step S304, the location detection section 4 detects the location of the vehicle, and passes it to the guidance section 6. In step S305, based on the vehicle location detected by the location detection section 4, and the route information provided by the route selection section 3, the guidance section 6 determines whether the user has reached the destination. If the user has already reached, this is the end of the procedure, and if not yet, the procedure goes to step S306.

In step S306, the guidance section 6 requests the real-time information acquisition section 10 to acquire any appropriate real-time information. In response, the real-time information acquisition section 10 acquires any appropriate real-time information, and passes it to the guidance section 6.

In step S307, the guidance section 6 selects one arbitrary landmark (target landmark) from those others located within the range of route guidance. If the user has selected any specific category(ies) for the commercial information in step S301, the target landmark should be the one belonging to the selected category(ies).

In subroutine step S308, the guidance section 6 determines whether or not to display the selected target landmark. If determined yes, the guidance section 6 compares the target landmark with others in terms of priority. Also, the guidance section 6 refers to the real-time information provided by the real-time information acquisition section 10 to determine which additional information included therein should be displayed. The details of the process in subroutine step S308 are left for later description.

In step S309, the guidance section 6 determines whether there is any landmark left for guidance. If yes, the procedure returns to step S307 so that the guidance section 6 repeats the above procedure until no landmark is left for guidance. The procedure then goes to step S310.

In step S310, the guidance section 6 generates guidance information from the route information provided by the route selection section 3 and the landmark information determined based on the above sequence of processes. Thus generated guidance information is forwarded to the output section 7 for display thereon. In the case if the user feels like going to the target landmark by seeing the displayed landmark information, the user specifies the landmark, typically, clicks the landmark by using a mouse, for example.

In subroutine step S311, the guidance section 6 generates cumulative information about the landmark information by incrementing the number of times the displayed landmark information has been so far displayed, for example. Typically, the guidance section 6 applies a process to the cumulative information so as to send it out to the landmark server 30 with predetermined time intervals. The process in subroutine step S311 will be described in detail.

The procedure then returns to step S305 so that the location detection section 4 again detects the location of the vehicle, and the above described procedure is repeated until the vehicle reaches the destination.

Figure 5:
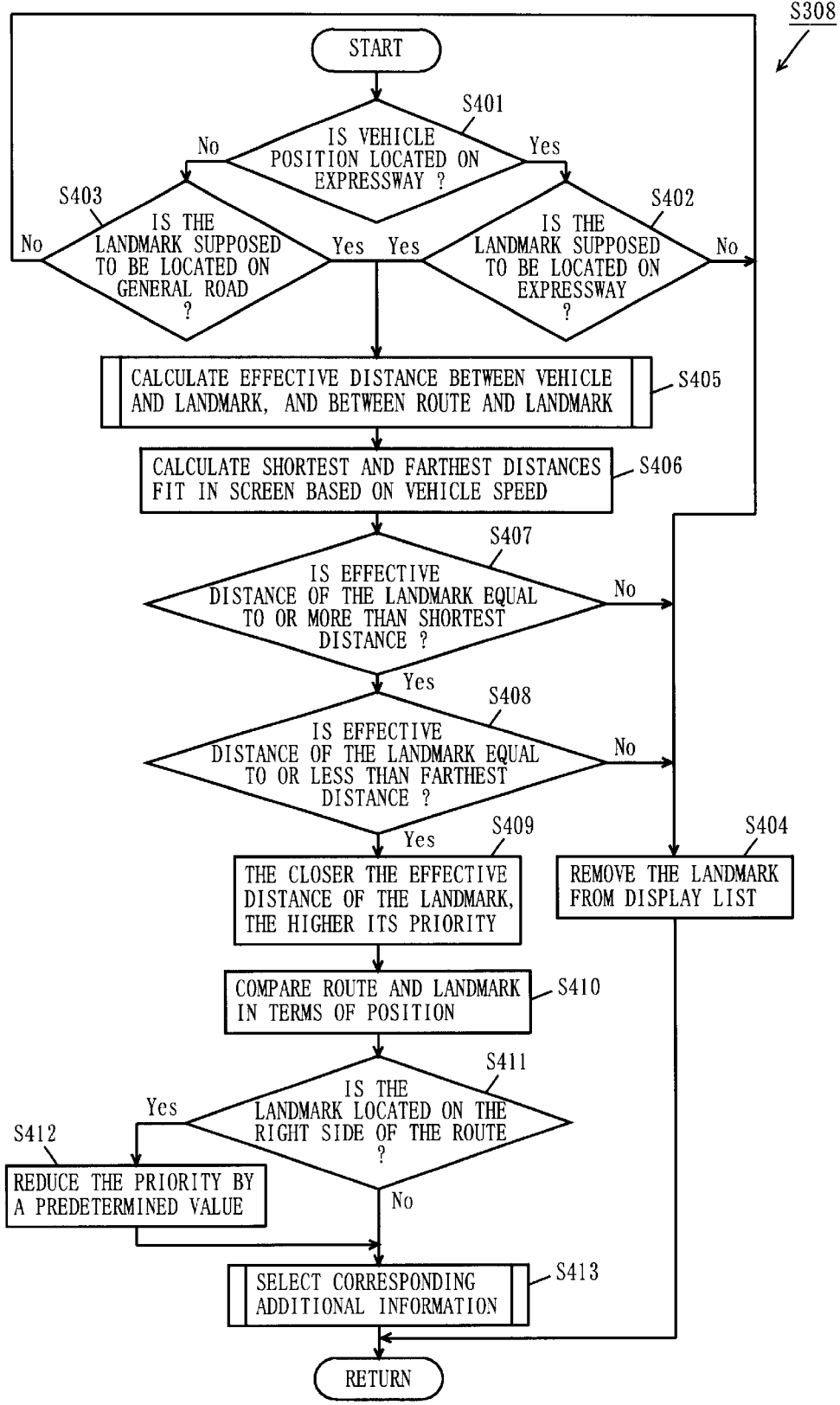
FIG. 5 is a flowchart showing the detailed procedure in subroutine step S308.

Described next is the procedure in step S308 of FIG. 4. FIG. 5 is a flowchart showing the sequence of processes in subroutine step S308 of FIG. 4 in detail. Referring to FIG. 5, described now are processes to be applied by the present navigation device for landmark selection and additional information selection.

In step S401, the guidance section 6 determines whether or not the vehicle location detected by the location detection section 4 is positioned on an expressway. If yes, the procedure goes to step S402, otherwise the procedure goes to step S403.

In step S402, the guidance section 6 determines whether or not the selected target landmark is the one which should be located on an expressway. If yes, the procedure goes to subroutine step S405, otherwise the procedure goes to step S404. Similarly, in step S403, the guidance section 6 determines whether or not the target landmark is the one which should be located on an ordinary road. If yes, the procedure goes to subroutine step S405, and if not, to step S404.

In step S404, the guidance section 6 leaves out the selected target landmark from the list for display, and ends this subroutine process. By the time when step S404 has been through, any landmark which is not for the type of the road on which the vehicle is currently moving will be removed out of the display list.

In subroutine step S405, the guidance section 6 calculates an effective distance from the distance between the vehicle and the guidance route, and the distance between the vehicle and the landmark. Here, the effective distance is a parameter for assigning priorities to landmarks for display.

Figure 6:
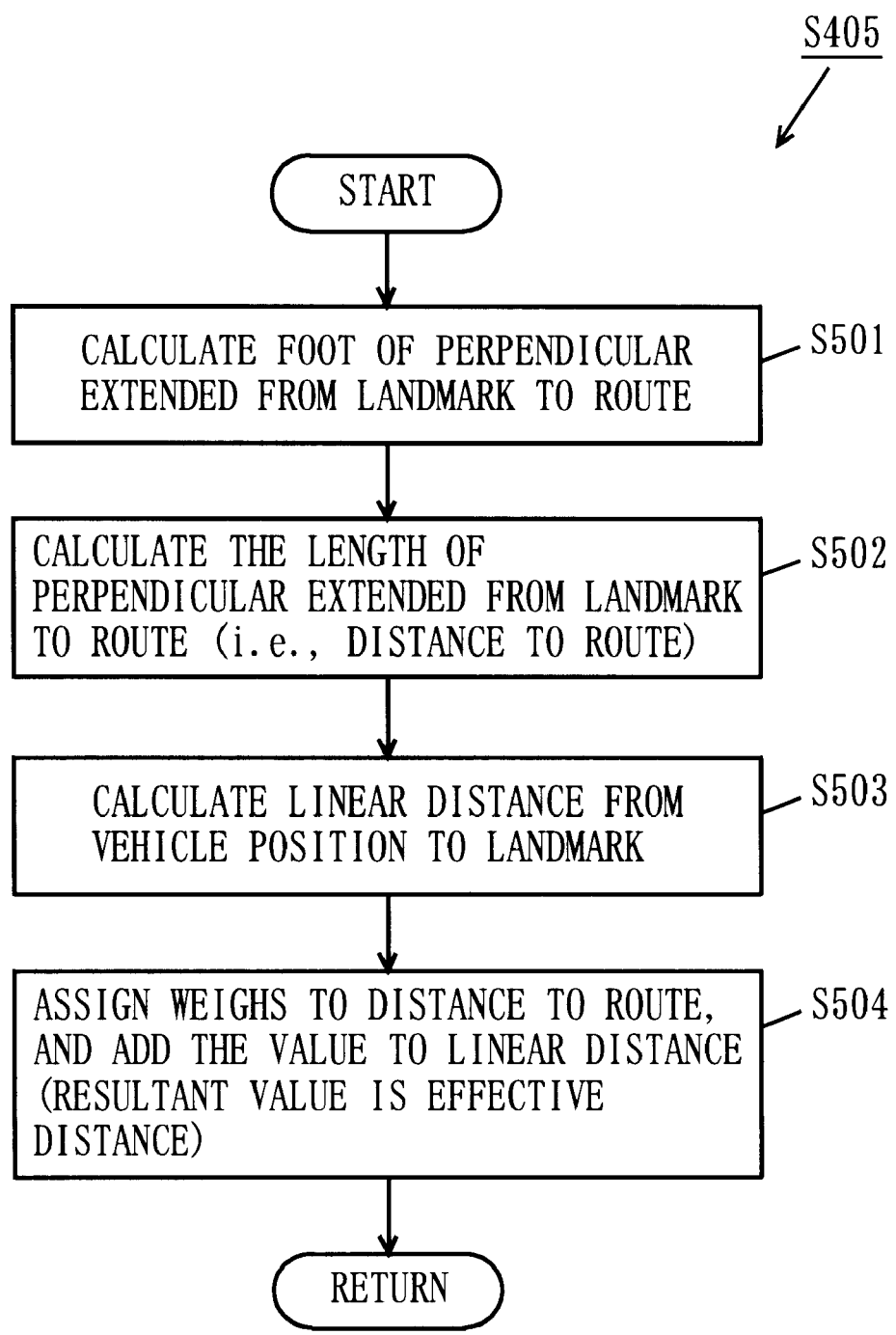
FIG. 6 is a flowchart showing the detailed procedure in subroutine step S405.

FIG. 6 is a flowchart showing the procedure in subroutine step S405 of FIG. 5 in detail. In step S501 of FIG. 6, the guidance section 6 calculates where is a foot of a perpendicular extended from the landmark to the guidance route. Then, in step S502, based on the location calculated in step S501, the guidance section 6 calculates the length of the perpendicular, that is, the distance to the guidance route. In step S503, the guidance section 6 calculates the linear distance from the vehicle location to the landmark. Lastly, in step S504, the guidance section 6 assigns weighs to the distance calculated in step S502, and adds the value to the linear distance calculated in step S503. The resultant value is the effective distance. This is the end of this subroutine process, and the procedure returns to the sequence of processes of FIG. 5.

Referring back to FIG. 5, in step S406, the guidance section 6 calculates the shortest distance and the farthest distance which can be fit on the screen. These distances are calculated based on the vehicle speed, and generally, the shortest distance is a minimum distance to be covered by the vehicle before the user acknowledges the landmark and then stops the vehicle. The farthest distance is a maximum distance to be covered by the vehicle until the user acknowledges the landmark and thinks to stop the vehicle. These distances may be calculated by equations, or with a table previously prepared based on an empirical rule.

In step S407, the guidance section 6 determines whether the effective distance of the landmark is the shortest distance or more. If yes, the procedure goes to step S408. If no, the procedure goes to step S404 so that the landmark is left out from the display list.

In step S408, the guidance section 6 then determines whether the effective distance of the landmark is the farthest distance or less. If yes, the procedure goes to step S409. If no, the procedure goes to step S404 so that the landmark is left out from the display list.

In step S409, the guidance section 6 assigns priorities to the landmarks in such a manner that the landmark showing the shorter effective distance is given a higher priority. Then in step S410, the guidance section 6 compares the guidance route and each of the landmarks in terms of position. In step S411, by referring to the comparison result, the guidance section 6 makes a determination for each of the landmarks whether or not it locates on the right side of the guidance route with respect to the heading direction of the vehicle. If yes, the procedure goes to step S412, otherwise goes to subroutine step S413. In step S412, the guidance section 6 lowers the priority assigned to the landmark by a predetermined value. This is because it is difficult for the vehicle driving on the left side of the road to drop by the landmark located on the right side of the road. Accordingly, the priority assigned to such a landmark should be lowered for effect. Then, the procedure goes to subroutine step S413.

In subroutine step S413, the guidance section 6 selects additional information corresponding to the selected landmark. Here, such a process of selecting additional information for advertising is described in detail.

Figure 7:
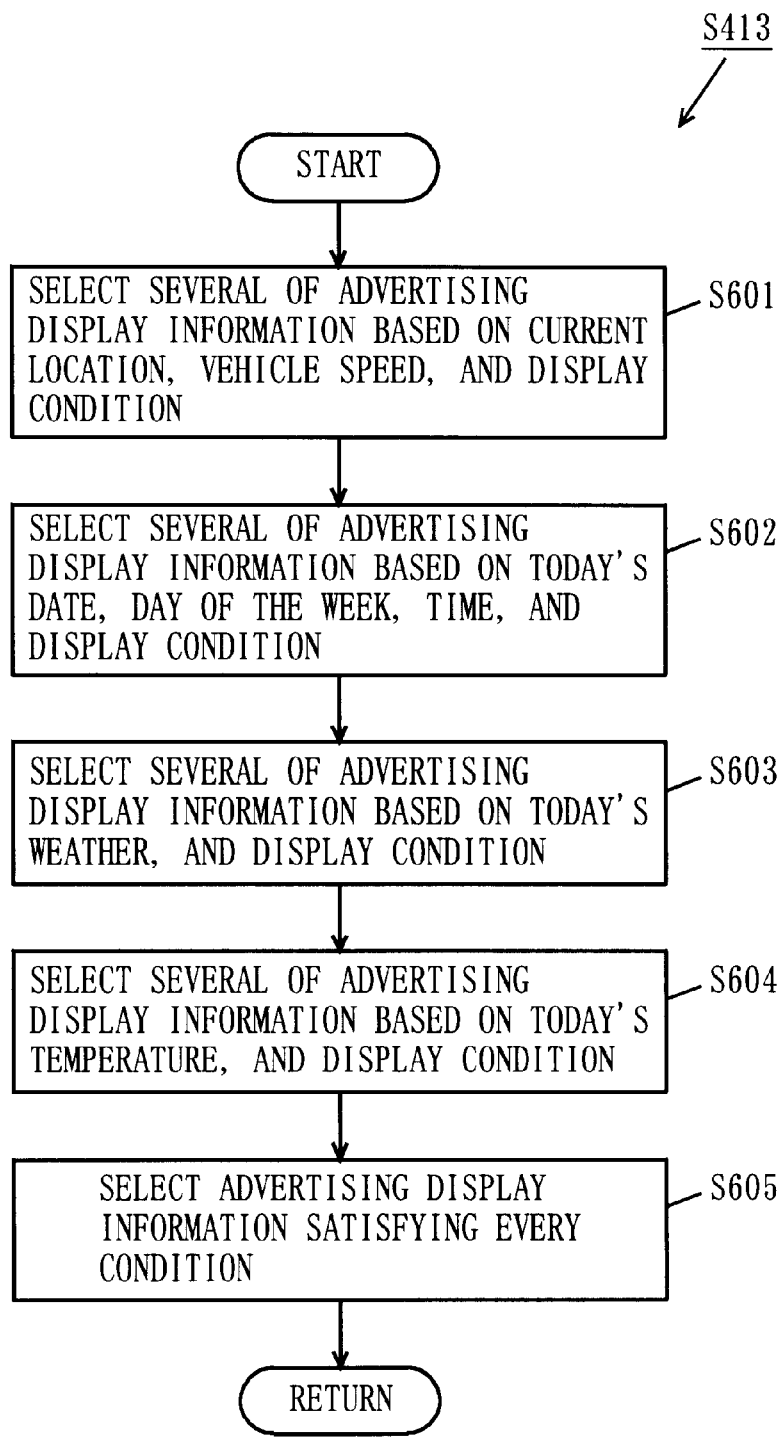
FIG. 7 is a flowchart showing the detailed procedure in subroutine step S413.

FIG. 7 is a flowchart showing the detailed procedure in subroutine step S413 of FIG. 5. In S601 of FIG. 7, the guidance section 6 selects additional information satisfying the display condition based on the location and speed of the vehicle. As an example, considered is a case where there prepared messages varying in length depending on the vehicle speed.

In step S602, the guidance section 6 searches for the selected additional information to find if there is any additional information therein satisfying the display condition in terms of today's date, day of the week, and time. As an example, considered is a case where there prepared a message saying free Santa doll on Christmas.

In step S603, the guidance section 6 again searches for the selected additional information to find if there is any additional information therein satisfying the display condition in terms of weather. In step S604, the guidance section 6 again searches for the selected additional information to find if there is any additional information satisfying the display condition in terms of temperature. In this manner, the additional information which is found as satisfying those display conditions is determined as the additional information for display (step S605). This is the end of the subroutine process, and the procedure returns to the sequence of processes of FIG. 5, and then to that of FIG. 4.

Figure 8:
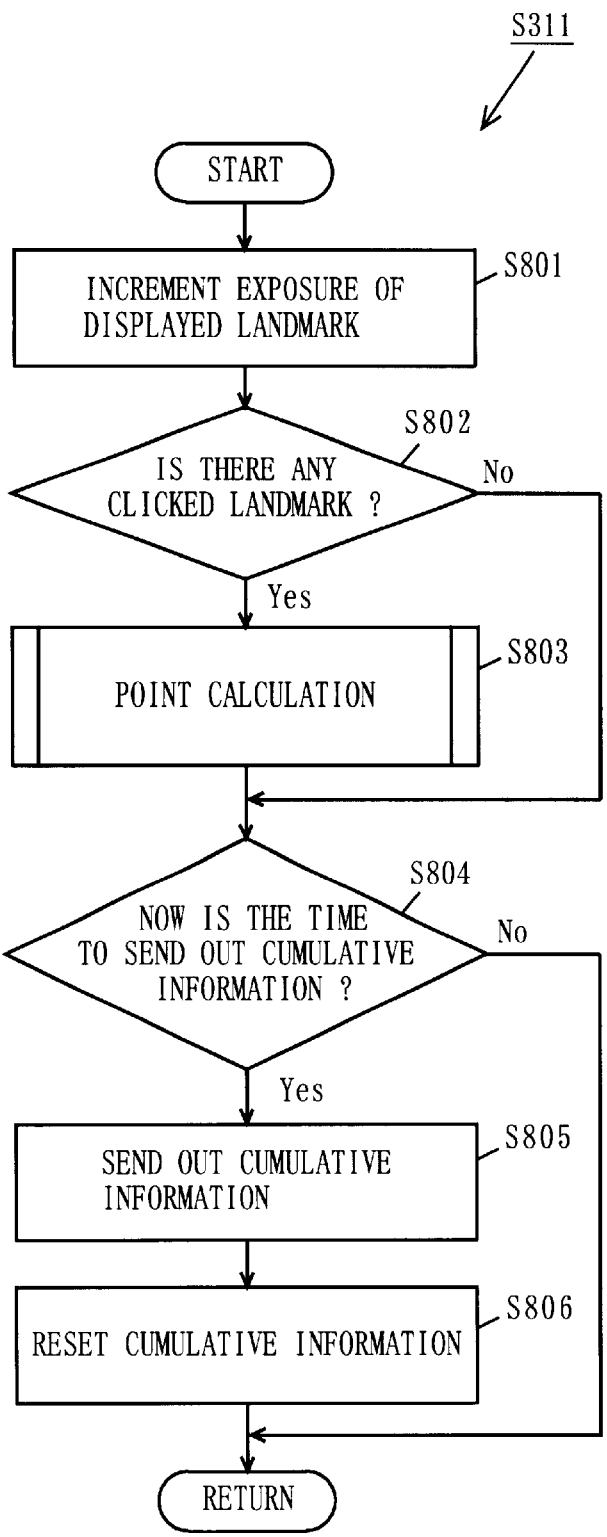
FIG. 8 is a flowchart showing the detailed procedure in subroutine step S311.

The procedure in subroutine step S311 of FIG. 4 is now described in detail. FIG. 8 is a flowchart showing the detailed procedure in subroutine step S311.

In step S801 of FIG. 8, the guidance section 6 increments the number of times the landmark has been so far exposed (hereinafter, exposure). The exposure is stored as cumulative information for each of the landmarks. The cumulative information may be stored in a landmark cumulative information storage section (not shown), or in the landmark information storage section 9.

In step S802, the guidance section 6 determines whether there is any landmark clicked by the user in step S310 of FIG. 4. If yes, the procedure goes to step S803, otherwise jumps to step S804.

In subroutine step S803, the guidance section 6 determines whether the user has actually reached the clicked landmark. If yes, the guidance section 6 calculates a predetermined point in accordance with a predetermined scoring method, and stores the resultant point as the cumulative information while interrelating the point to the landmark information. Alternatively, the guidance section 6 may add a predetermined point to the landmark information regardless of whether the user has reached the landmark. This is because the user's clicking the landmark means the advertising has successfully captured his/her interests. The procedure in subroutine step S803 is described below in more detail.

Figure 9:
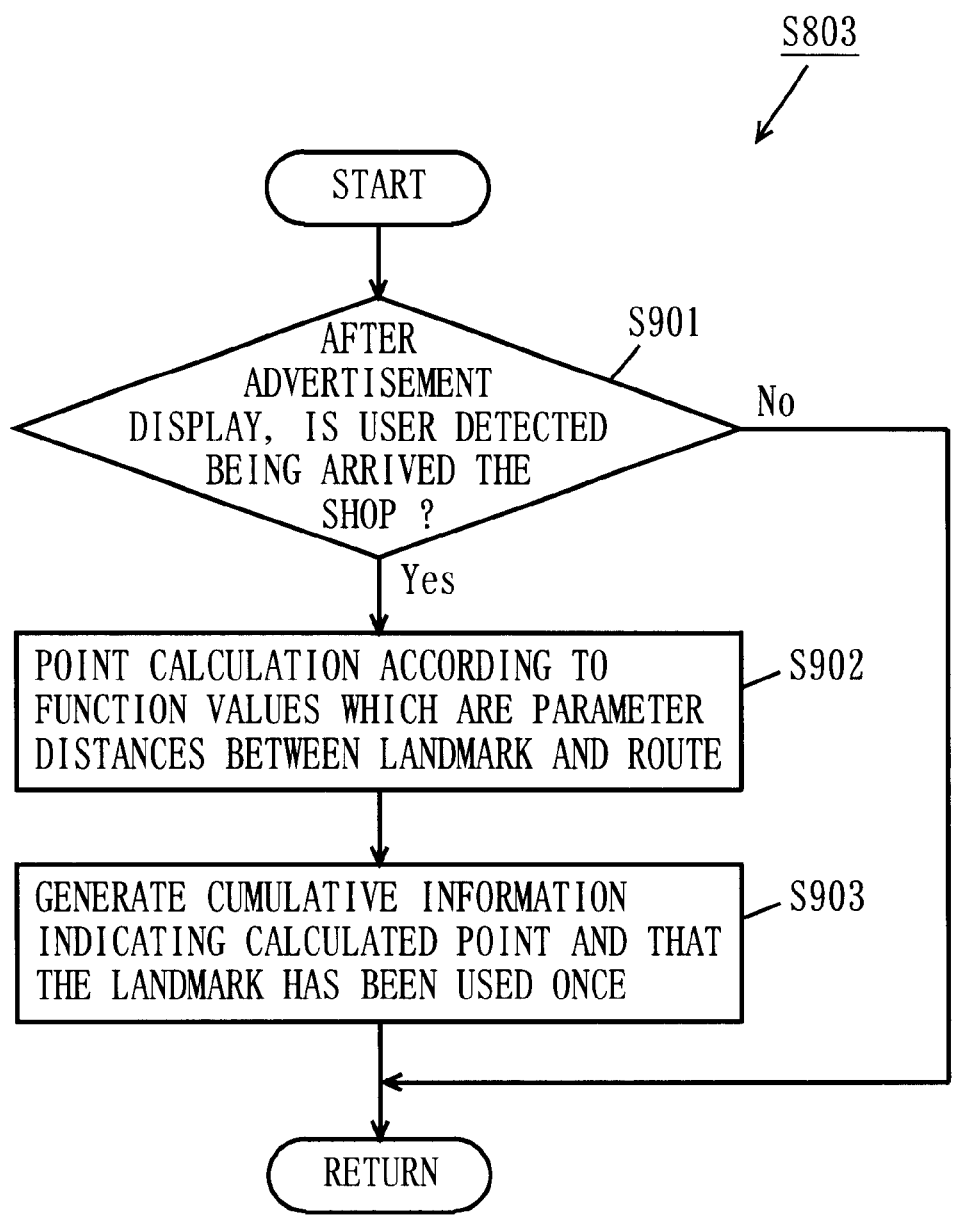
FIG. 9 is a flowchart showing the detailed procedure in subroutine step S803.

FIG. 9 is a flowchart showing the procedure in subroutine step S803 of FIG. 8 in detail. In step S901 of FIG. 9, the guidance section 6 determines, after the landmark information is displayed, whether the user has reached the retail shop represented by the corresponding landmark. Specifically, if the vehicle location detected by the location detection section 4 coincidences with coordinates of the landmark, and if the vehicle remains parked for a predetermined length of time or longer, the user is determined as having reached the landmark, i.e., retail shop. The guidance section 6 makes a determination under such conditions. This is not restrictive, and the user may click a button provided on the input device 2 when he/she reaches the shop, and the guidance section 6 may detect the input. In response to the user's arrival, a certificate issue section (not shown) may issue a certificate available as a discount ticket. As such, after detecting the user having arrived at the shop, the procedure goes to step S902. If not, this is the end of this subroutine process, and the procedure returns to the sequence of processes of FIG. 8.

In step S902, the guidance section 6 performs point calculation in accordance with predetermined function values, which are parameters of the guidance route having the landmark located thereon and the distance thereto. In this manner, the guidance section 6 calculates a point which represents advertising effects of the landmark information with the corresponding landmark utilized. Typically, the guidance section 6 uses the effective distance calculated in step S504 of FIG. 6 as the point.

In step S903, the guidance section 6 generates the cumulative information indicating the calculated point and that the landmark has been used once. This is the end of the subroutine process, and the procedure returns to the sequence of processes of FIG. 8.

In step S804 of FIG. 8, the guidance section 6 determines whether now is the time to send out the cumulative information. Typically, such timing is so predetermined as to come every five minutes, for example. If there is no need to consider the communications cost, the cumulative information may be sent out whenever such timing comes. On the contrary, to reduce the communication cost, the cumulative information may be collectively sent out after completion of route guidance. If determined that now is the time to send out the cumulative information, the procedure goes to step S805. If not, this is the end of this subroutine step, and the procedure returns to the sequence of processes of FIG. 4.

In step S805, the guidance section 6 instructs the landmark information management section 8 to forward the cumulative information. As already described, the landmark information management section 8 responsively extracts the cumulative information stored in the landmark cumulative information storage section or the landmark information storage section 9 for transfer to the landmark server 30 via the communications section 11. Here, at the time of transfer, a terminal ID uniquely assigned to the navigation device 1 is transmitted together with the cumulative information.

In step S806, the guidance section 6 resets the transferred cumulative information in such a manner as to store new information. Here, the clicked landmark is presumably not reset until the user reaches the retail shop. This is the end of the subroutine process, and the procedure returns to the sequence of processes of FIG. 4, which are already described.

As described above, with the navigation device 1 of the present embodiment, landmark information used for route guidance can always be the most current, and the landmark information can be displayed in an effective manner with real-time information reflected.

Described next are the detailed structure and operation of the landmark server 30 and the retailer terminal 40 in the landmark update system of the present embodiment with reference to FIG. 10.

Figure 10:
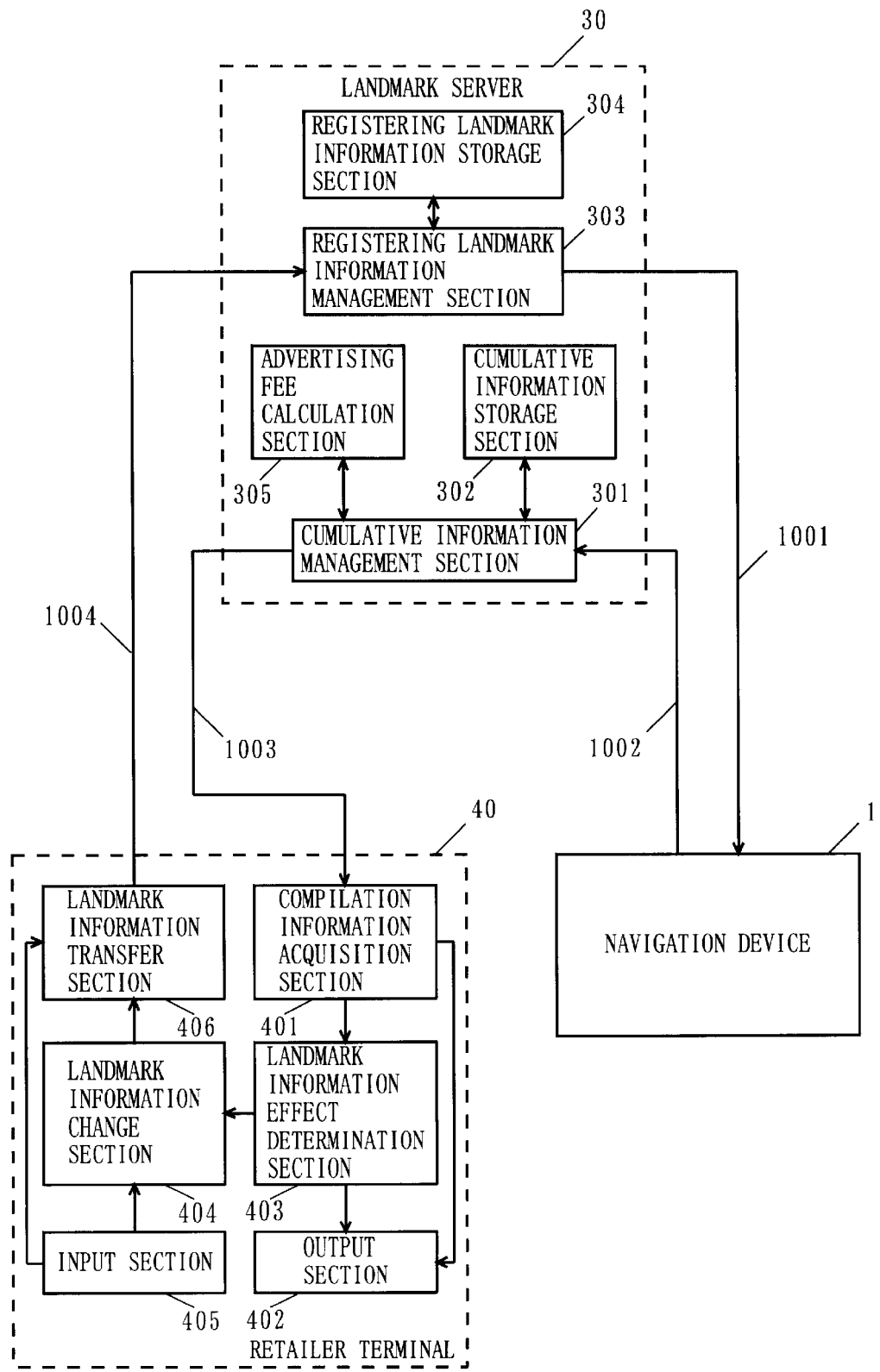
FIG. 10 is a block diagram showing the detailed structure of a landmark server 30 and a retailer terminal 40 in the landmark update system of FIG. 1.

In FIG. 10, the landmark server 30 includes a cumulative information management section 301, a cumulative information storage section 302, a registering landmark information management section 303, a registering landmark information storage section 304, and an advertising fee calculation section 305. The retailer terminal 40 includes a compilation information acquisition section 401, an output section 402, a landmark information effect determination section 403, a landmark information change section 404, an input section 405, and a landmark information transfer section 406. These constituents can be realized by general computer systems. Typically, the landmark server 30 and the retailer terminal 40 include, respectively, a CPU operating in accordance with programs recorded on recording media, a storage device typified by a semiconductor memory or a hard disk drive for storing various data, and a communications device such as a modem or a router.

In the landmark server 30 of FIG. 10, the cumulative information storage section 301 receives cumulative information 1002 coming from the navigation device 1, and stores it in the cumulative information storage section 302 according to a terminal ID attached thereto.

The cumulative information management section 301 then goes through various compilation processes based on the cumulative information in its entirety so far stored therein, so that compilation data 1003 is generated. The compilation data 1003 is not restricted in type, and any information will do as long as it is helpful for the companies and retail shops, i.e., landmarks. For example, the compilation data 1003 includes information compiled on the basis of chain shop, time, day, a day of the week, region, vehicle type, weather, user's category selection, and the like. If possible, the user's personal information such as sex, age, occupation, address (roughly), route, and the like, will be used as the basis thereof. It should be noted that the compilation data 1003 shall include a point corresponding to whatever landmark is used. The cumulative information management section 301 transfers thus generated compilation data 1003 partially or entirely to the retailer terminal 40 with predetermined time intervals, for example.

Then, in the retailer terminal 40, the compilation information acquisition section 401 receives the compilation data 1003 coming from the landmark server 30, and forwards it to the landmark information effect determination section 403, and at the same time, outputs it to the output section 402 responding to the user's request coming from the retailer terminal 40.

The landmark information effect determination section 403 analyzes the compilation data 1003 inputted under a predetermined method, and then determines an advertising effect, which indicates if the landmark information is being used by the user with a predetermined frequency or the number of times. Typically, the landmark information effect determination section 403 calculates how many points the landmark information has obtained by totalling points coming from the navigation devices. The resultant total is then compared with a predetermined value. The information about thus determined advertising effect is outputted to the output section 402 responding to the user's request coming from the retailer terminal 40. For example, if the advertising effect is considered not enough, a warning message is outputted to prompt the retail shops and companies to change the advertisement or make it more informative. This message information is forwarded to the landmark information change section 404.

If the advertising effect is determined as not being enough, the landmark information change section 404 selects an advertisement considered optimum from those varying in pattern which are previously generated. In this manner, the landmark information is updated. Alternatively, to make the landmark information more informative, several advertisements each carrying different contents may be displayed in order. Although the landmark information is automatically changed in the above, the advertising contents provided by the input section 405 may be the deciding factor for the change. The changed landmark information is forwarded to the landmark information transfer section 406.

The landmark information transfer section 406 transfers the changed landmark information as the registering landmark information 1004 so as to register it to the landmark server 30. Here, the landmark information transfer section 406 may transfer the registering landmark information 1004 immediately, or wait for the user's instruction provided via the input section 405.

In the landmark server 30, the registering landmark information management section 303 receives the registering landmark information 1004 coming from the retailer terminal 40, and stores, i.e., updates, the corresponding landmark information in the registering landmark information storage section 304. The landmark information stored as such is, as described above, transferred as the to-be-updated landmark information 1001 responding to the request coming from the navigation device 1. Here, before transferring to the navigation device 1, the to-be-updated landmark information 1001 may be subjected to screening or filtering by utilizing the user's selected advertising category. Further, screening may be performed based on the user's personal information, offering the user advertisement which meets his/her preferences.

In the landmark server 30, the advertising fee calculation section 305 typically receives the compilation data 1003 from the cumulative information management section 301 at a predetermined date and time. Then, the advertising fee calculation section 301 calculates how much to charge the owner of the retailer terminal 40, i.e., companies and retail shops.

To calculate the advertising fee, for example, a unit fee per exposure is determined in advance in relation to the number of landmark exposure times. The advertising fee is obtained by multiplying the unit fee by the number of exposure times in total. That is, the more often the user sees the landmark information, the more expensive advertising fee becomes. The unit fee may be reduced in accordance with the points representing the advertising effect. As such, calculating the advertising fee based on the number of exposure times and the advertising effect lead to the fair and substantial price for the user.

Here, the navigation device 1 of the present embodiment is presumably of a vehicle-mounting type. This is not restrictive, and the navigation device 1 may be equipped in mobile phones to carry around. In such a case, the user is not so restricted in operation unlike when he/she is driving, therefore the navigation device 1 may be equipped with the function of advertisement search. For example, if the user once searches for data with "television" as a keyword, advertisements relevant to "television" may have higher priority at the time of next data search. Display scrolling is a possibility, and if so, the advertising fee may be determined based on the advertisement display position. For example, the more the advertiser pays, the higher the display position of his/her landmark information comes. This is because display scrolling is cumbersome for the user.

Further, such a navigation device of a carry-around type does not have to consider the positional relationship between the user's current location and landmarks so much. This is because its route guidance is limited to a range coverable by the user on foot. Accordingly, in the navigation device of a carry-around type, the relevant sequence of processes is omissible.

While the invention has been described in detail, the foregoing description is in all aspects illustrative and not restrictive. It is understood that numerous other modifications and variations can be devised without departing from the scope of the invention.

What is claimed is:

1. A landmark update system for updating landmark information to be displayed together with a route for route guidance, said system comprising:

a navigation device operable to perform route guidance through the use of landmark information which is determined as the latest based on incoming landmark information over a first communication line, to increment a counter of a number of times a landmark is displayed, to calculate points based on a level of interaction between a user and the landmark, and to generate cumulative information from at least the incremented counter and the calculated points;

a landmark server operable to communicate with said navigation device through communications over the first communication line, and to offer the latest landmark information which is registered; and a retailer terminal operable to register the latest landmark information to said landmark server by communicating with said landmark server over a second communication line, wherein said navigation device is operable to transfer said generated cumulative information to said landmark server over the first communication line, and wherein, based on the cumulative information transferred over the first communication line and information about the navigation device from which the cumulative information is transferred, said landmark server is further operable to generate compilation data obtained by subjecting the cumulative information to a compilation process, and to transfer the compilation data to a corresponding retailer terminal over the second communication line.

2. The landmark update system according to claim 1, wherein said landmark information includes:

location information which indicates the location of a landmark;

shape information which specifies the landmark by shape for display; and additional information which is displayed to the user together with the landmark.

3. The landmark update system according to claim 2, wherein said landmark information further includes a display condition which indicates a predetermined condition for displaying said additional information.

4. The landmark update system according to claim 1, wherein said navigation device comprises:

a cartographic data storage section operable to store cartographic data;

a landmark information storage section operable to store landmark information;

a location detecting section operable to detect a user's current location;

a communications section operable to communicate with said landmark server;

an output section operable to output a route guidance for display;

an input section operable to input information to be used in route searching;

a route selection section operable to select, with reference to the information inputted by said input section, a route from the user's current location detected by said location detection section;

a landmark information management section operable to manage the landmark information stored in said landmark information storage section, to receive the latest landmark information from said landmark server via said communications section and to update landmarks along the selected route as required;

a guidance section operable to instruct said output section to display a map based on cartographic data read from said cartographic data storage section, to display the selected route on the map, to perform landmark display on each appropriate location on the map based on the landmark information read from said landmark information storage section, to increment a counter corresponding to a number of times a landmark is displayed, to calculate points based on a level of interaction between the user and the landmark, and to generate cumulative information from at least the incremented counter and the calculated points, wherein said landmark information management section is further operable to forward said cumulative information to said landmark server upon instruction from said guidance section.

5. The landmark update system according to claim 4, wherein said guidance section is further operable to refer to the user's current location detected by said location section, and when it is determined that the user has reached a specific displayed landmark by utilizing the same location section, to generate the cumulative information based on information about the utilized landmark.

6. The landmark update system according to claim 4, wherein said navigation device further includes a real-time information acquisition section operable to acquire real-time information indicating at least the present states of a vehicle, the environment around the vehicle, and time, and wherein, based on the real-time information acquired by said real-time information acquisition section, said guidance section is further operable to specifically determine landmark display.

7. A navigation device for updating landmark information to be displayed together with a route for route guidance, said navigation device communicating with a landmark server offering the latest landmark information, said navigation device comprising:

a cartographic data storage section operable to store cartographic data;

a landmark information storage section operable to store landmark information;

a location detecting section operable to detect a user's current location;

a communications section operable to communicate with said landmark server;

an output section operable to output a route guidance for display;

an input section operable to input information to be used in route searching;

a route selection section operable to select, with reference to the information inputted by said input section, a route from the user's current location detected by said location detection section;

a landmark information management section operable to manage the landmark information stored in said landmark information storage section, to receive the latest landmark information from said landmark server via said communications section and to update landmarks along the selected route as required;

a guidance section operable to instruct said output section to display a map based on cartographic data read from said cartographic data storage section, to display the selected route on the map, to perform landmark display on each appropriate location on the map based on the landmark information read from said landmark information storage section, to increment a counter corresponding to a number of times a landmark is displayed, to calculate points based on a level of interaction between the user and the landmark and to generate cumulative information from at least the incremented counter and the calculated points, wherein said landmark information management section is further operable to forward said cumulative information to said landmark server upon instruction from said guidance section.

8. The navigation device according to claim 7, wherein said guidance section is further operable to refer to the user's current location detected by said location section, and when it is determined that the user has reached a specific displayed landmark by utilizing the same location section, to generate said cumulative information based on information about the utilized landmark.

9. The navigation device according to claim 7, further comprising a real-time information acquisition section operable to acquire real-time information indicating at least the present states of a vehicle, the environment around the vehicle, and time, wherein based on the real-time information acquired by said real-time information acquisition section, said guidance section is further operable to specifically determine landmark display.

10. The navigation device according to claim 7, wherein said cumulative information includes:

the number of times the landmark is displayed to a user on said navigation device; and point information in which the user's visit to the displayed landmark is scored.

11. The navigation device according to claim 7, wherein said landmark information includes:

location information which indicates the location of a landmark;

shape information which specifies the landmark by shape for display; and additional information which is displayed to the user together with the landmark.

12. The navigation device according to claim 11, wherein said landmark information further includes a display condition which indicates a predetermined condition for displaying said additional information.

* * * * *

UNITED STATES PATENT AND TRADEMARK OFFICE
CERTIFICATE OF CORRECTION

PATENT NO. : 6,728,635 B2
DATED : April 27, 2004
INVENTOR(S) : Hiroyuki Hamada et al.

It is certified that error appears in the above-identified patent and that said Letters Patent is hereby corrected as shown below:

Title page,
Item [56], References Cited, FOREIGN PATENT DOCUMENTS, foreign reference "JP 11-095657" is listed twice.
Insert -- JP 11-095657   4/1999 -- and delete "JP 11-095657 9/1999 …….. G09B/29/00"

Signed and Sealed this

Ninth Day of November, 2004

JON W. DUDAS
*Director of the United States Patent and Trademark Office*